(No Model.)
A. L. JOHNSTON.
BONDING JOINTS FOR ELECTRIC RAILWAYS.
No. 523,284. Patented July 17, 1894.
FIG 1
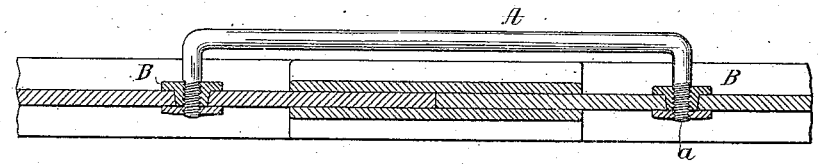
FIG 2
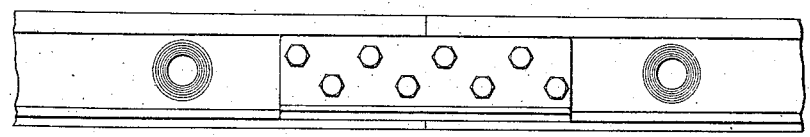
FIG 3
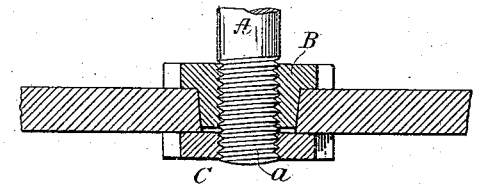
FIG 4
FIG 5
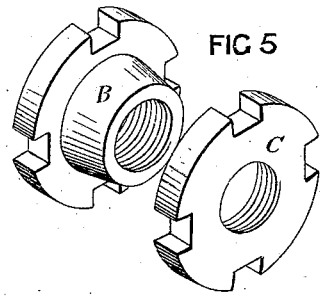
WITNESSES
F. D. Goodwin
Hamilton D. Turner
INVENTOR
Andrew L. Johnston
By his Attorneys
Howson & Howson

UNITED STATES PATENT OFFICE.

ANDREW LANGSTAFF JOHNSTON, OF RICHMOND, VIRGINIA.

BONDING JOINT FOR ELECTRIC RAILWAYS.

SPECIFICATION forming part of Letters Patent No. 523,284, dated July 17, 1894.

Application filed May 5, 1894. Serial No. 510,129. (No model.)

*To all whom it may concern:*

Be it known that I, ANDREW LANGSTAFF JOHNSTON, a citizen of the United States, and a resident of Richmond, Virginia, have invented certain Improvements in Bonding Joints for Electric Railways, of which the following is a specification.

The object of my invention is to make a simple and effective bond connection for electrically uniting two abutting rails by means of bonding wires; this object I attain in the following manner, reference being had to the accompanying drawings, in which—

Figure 1, is a sectional plan view of two abutting rails showing the bond in position. Fig. 2, is a side view of the abutting rails, showing the holes prepared to receive the bonds. Fig. 3, is an enlarged sectional view, showing the confining nuts. Fig. 4, is a detached perspective view of the nuts; and Fig. 5, is a sectional view of one of the nuts prior to its application to the bond.

Heretofore the method of bonding the rail joints of electric railways has been simply to insert the wire into a hole previously drilled in the rail and then rivet the same thereto. With this method, however, it has been found that there is not enough electrical contact, it being a well known electrical law that all connections should have at least ten times the amount of bearing surface as the area of the conductor.

The main feature, therefore, of my invention consists in providing additional electrical contact for the bond by means of flanged confining nuts which embrace the end of the bond and which are screwed tight against the sides of the web of the rail; the rail having been previously faced off so as to insure a close fit.

In carrying out my invention I first ream the holes in each rail to a taper by means of a special tool, and then face off each side of the rails around the holes so as to provide a smooth surface, against which the nuts can be screwed tight to afford the proper contact. I then take the wire bond A and bend it as shown in Fig. 1, and screw thread the ends $a$, and mount on these screw threaded ends the sleeve nuts B, one on each end, the exterior surfaces of these nuts B being conical in order to fit into the tapered openings in the rail.

The sleeve nuts B are screwed onto the ends of the bonding wire to a distance sufficient to expose a portion of the screw thread of each end, and adapted to this screw threaded portion is a confining nut C, which bears against the opposite face of the web of the rail in the present instance. By tightening up on this nut C the bonding wire is not only securely locked to the sleeve nut B; but the nut C is itself confined hard against the web of the rail and the conical portion of the nut B is forced into the tapered opening of the rail, thus insuring a perfectly tight joint.

To insure the nut C fitting tightly against the rail I preferably make it slightly concaved, as shown in Fig. 5, so that as it is screwed onto the threaded portion of the bonding wire it will have a tendency to confine the wire tighter than if it were perfectly flat.

The flanges of each nut may be square or hexagonal but I prefer to make them annular and provide them with recesses adapted to a spanner, as shown in Fig. 4.

I claim as my invention—

1. The combination of the rail having a tapered perforation, with a bonding wire, a sleeve fitted to said wire, and adapted to fit snugly in the tapered perforation of the rail and having a flange bearing against one side of the rail, and a nut adapted to bear against the opposite side of the rail, and to draw the tapered sleeve into the opening in the rail, the contact area of the connection being greater than the cross-sectional area of the bonding wire, substantially as described.

2. The combination of the rail, perforated to receive a bonding connection, a bonding wire, with a nut adapted to the hole in the rail, said nut having a flange adapted to bear against the surface of the rail, substantially as described.

3. The combination in a rail bond, of a wire having threaded ends, nuts B adapted to the threaded portion of said wire having a conical periphery adapted to a conical hole in the rail and a flange adapted to bear against one side of the rail, with a confining nut on the opposite side of the rail adapted to the projecting threaded portion of the bonding wire, substantially as described.

4. A rail bond consisting of a wire having threaded ends, nuts B adapted to the threaded ends mounted on one side of the rail, and nuts C mounted on the opposite side of the rail, also adapted to the threaded ends of the bond, substantially as described.

5. The combination of the bonding wire having threaded ends, the nuts B adapted to the threaded portions of the same and having a conical periphery adapted to a conical opening in the rail, with a confining nut adapted to be attached to the bonding wire on the other side of the rail, substantially as described.

In testimony whereof I have signed my name to this specification in the presence of two subscribing witnesses.

ANDREW LANGSTAFF JOHNSTON.

Witnesses:
MURRAY C. BOYER,
JOSEPH H. KLEIN.